US012804166B2

(12) United States Patent
Han et al.

(10) Patent No.: US 12,804,166 B2
(45) Date of Patent: Nov. 17, 2026

(54) IMAGE CODING METHOD AND APPARATUS, IMAGE DECODING METHOD AND APPARATUS, READABLE MEDIUM, AND ELECTRONIC DEVICE

(71) Applicant: CHINA TELECOM CORPORATION LIMITED, Beijing (CN)

(72) Inventors: Tao Han, Beijing (CN); Yuan Zhang, Beijing (CN); Mingchuan Yang, Beijing (CN); Hanming Wang, Beijing (CN); Zekun Wang, Beijing (CN)

(73) Assignee: CHINA TELECOM CORPORATION LIMITED, Beijing (CN)

(*) Notice: Subject to any disclaimer, the term of this patent is extended or adjusted under 35 U.S.C. 154(b) by 0 days.

(21) Appl. No.: 18/994,380

(22) PCT Filed: Jul. 14, 2023

(86) PCT No.: PCT/CN2023/107504

§ 371 (c)(1),
(2) Date: Jan. 14, 2025

(87) PCT Pub. No.: WO2024/012574

PCT Pub. Date: Jan. 18, 2024

(65) Prior Publication Data

US 2026/0019601 A1 Jan. 15, 2026

(30) Foreign Application Priority Data

Jul. 15, 2022 (CN) ......................... 202210837739.2

(51) Int. Cl.
*H04N 19/167* (2014.01)
*H04N 19/119* (2014.01)
*H04N 19/176* (2014.01)

(52) U.S. Cl.
CPC ......... *H04N 19/167* (2014.11); *H04N 19/119* (2014.11); *H04N 19/176* (2014.11)

(58) Field of Classification Search
CPC .................................................... H04N 19/167
(Continued)

(56) References Cited

U.S. PATENT DOCUMENTS 5,144,688 A 9/1992 Bovir et al.
2007/0179918 A1 8/2007 Heisele et al.
(Continued)

FOREIGN PATENT DOCUMENTS

CN 1177298 C 11/2004
CN 112584154 A 3/2021
(Continued)

OTHER PUBLICATIONS

International Search Report for International Application No. PCT/CN2023/107504.
(Continued)

*Primary Examiner* — Amir Shahnami
(74) *Attorney, Agent, or Firm* — Perilla Knox & Hildebrandt; Kenneth A. Knox

(57) ABSTRACT

An image coding method and apparatus, an image decoding method and apparatus, a readable medium, and an electronic device are disclosed. The image coding method includes: obtaining an original image, and performing block processing to obtain a plurality of image blocks; calculating a gradient value of a pixel in each image patch, and screening for important region blocks according to the gradient values of the pixels; and inputting the important region patches and position information of the important region patches in the original image into a visual conversion model for coding so as to generate a bit stream.

9 Claims, 6 Drawing Sheets

(58) Field of Classification Search
USPC .................................................... 375/240.26
See application file for complete search history.

(56) References Cited

U.S. PATENT DOCUMENTS

| | | | | |
|---|---|---|---|---|
| 2007/0201751 | A1* | 8/2007 | Wu | H04N 19/149 382/232 |
| 2009/0067491 | A1 | 3/2009 | Sun et al. | |
| 2015/0312590 | A1 | 10/2015 | Thoreau et al. | |
| 2016/0154994 | A1* | 6/2016 | Kim | G06V 40/165 382/118 |
| 2019/0149834 | A1 | 5/2019 | Zhou et al. | |
| 2020/0105024 | A1 | 4/2020 | Mammou et al. | |
| 2020/0236371 | A1 | 7/2020 | Nishi et al. | |

FOREIGN PATENT DOCUMENTS

| | | | |
|---|---|---|---|
| CN | 111986280 | B | 6/2021 |
| CN | 113269277 | A | 8/2021 |
| CN | 114240975 | A | 3/2022 |
| CN | 114399646 | A | 4/2022 |
| CN | 114428866 | A | 5/2022 |
| CN | 114501010 | A | 5/2022 |
| CN | 115514976 | A | 12/2022 |
| JP | H06350992 | A | 12/1994 |
| JP | 2015211466 | A | 11/2015 |
| JP | 2020022145 | A | 2/2020 |
| WO | 2019069968 | A1 | 4/2019 |

OTHER PUBLICATIONS

Yuan Yanhui, Yang Changsheng, "Lossless Image Compression Based on Image Segmentation Technique" Computer Science 2002 vol. 29.

Zhaoxia Yang, Feng Lu, Yuesheng Li (2002) Computation of image gradient and divergence and their application to edge detection of Noisy images. Acta Sci Nat Univ Sunyatseni 41(6):6-9.

Notice of Allowance for CN Patent Application No. 2022108377392 of Feb. 12, 2025.

M. Lu, P. Guo, H. Shi, C. Cao, and Z. Ma, "Transformer-based Image Compression," arXiv preprint arXiv:2111.06707v1, Nov. 12, 2021.

First Office Action for JP Patent Application No. 2025-501514 of Feb. 3, 2026.

Extended European Search Report for European Patent Application No. 23839062.9 of Jul. 2, 2026.

Y. Chen, Z. Xiao, L. Zhao, L. Zhang, H. Dai, D. W. Liu, Z. Wu, C. Li, T. Zhang, C. Li, D. Zhu, T. Liu, and X. Jiang, "Mask-guided vision transformer (MG-ViT) for few-shot learning," arXiv preprint arXiv:2205.09995, May 2022.

K. Fischer, F. Brand, and A. Kaup, "Boosting neural image compression for machines using latent space masking," arXiv preprint arXiv:2112.0168, Dec. 2021.

H. Xu, S. Ding, X. Zhang, H. Xiong, and Q. Tian, "Masked autoencoders are robust data augmentors," arXiv preprint arXiv:2206.04846, Jun. 2022.

* cited by examiner

IMAGE CODING METHOD AND APPARATUS, IMAGE DECODING METHOD AND APPARATUS, READABLE MEDIUM, AND ELECTRONIC DEVICE

The present disclosure is a U.S. National Stage of International Application No. PCT/CN2023/107504, filed on Jul. 14, 2023, which is based on, claims the benefit of, and claims priority to Chinese Patent Application No. 202210837739.2 filed on Jul. 15, 2022, entitled "IMAGE CODING METHOD AND APPARATUS, IMAGE DECODING METHOD AND APPARATUS, READABLE MEDIUM, AND ELECTRONIC DEVICE", the entire contents of both of which are incorporated herein by reference.

TECHNICAL FIELD

The present disclosure belongs to the field of artificial intelligence technology and, specifically, relates to an image encoding method and apparatus, a decoding method and apparatus, a readable medium, and an electronic device.

BACKGROUND

Traditional image/video encoding is oriented towards human vision tasks and is mostly used for entertainment purposes, focusing on the fidelity, high frame rate, and definition of video data signals. With the rapid development of 5G, big data, and artificial intelligence, in the context of image/video big data applications, media contents such as images and videos are widely used in intelligent vision tasks such as target detection, target tracking, image classification, image segmentation, and pedestrian re-identification. These intelligent vision tasks are also called machine vision oriented intelligent tasks.

It should be noted that the information disclosed in the above background section is only used to enhance the understanding of the background of the present disclosure, and therefore may include information that does not constitute the prior art known to those of ordinary skill in the art.

SUMMARY

According to an aspect of embodiments of the present disclosure, an image encoding method is provided, the image encoding method including: acquiring an original image and performing image patching to obtain a plurality of image patches: calculating gradient values of pixels in each of the image patches, and screening key area patches from the plurality of image patches according to the gradient values of the pixels; and performing encoding by inputting the key area patches and position information of the key area patches in the original image into a vision transformation model to generate a bit stream.

According to an aspect of embodiments of the present disclosure, an image encoding apparatus is provided, including: an acquisition block, configured to acquire an original image and perform image patching to obtain a plurality of image patches: a calculation block, configured to calculate gradient values of pixels in each of the image patches, and screen key area patches from the plurality of image patches according to the gradient values of the pixels; and an encoding block, configured to perform encoding by inputting the key area patches and position information of the key area patches in the original image into a vision transformation model to generate a bit stream.

According to an aspect of embodiments of the present disclosure, there is provided an image decoding method for decoding an image encoded by the image encoding method as described above, the image decoding method including: receiving a bit stream generated by encoding: decoding the bit stream, and processing decoding results through normalization, a multi-head attention mechanism and a multi-layer perceptron, to output a reconstructed image.

According to an aspect of embodiments of the present disclosure, there is provided an image decoding apparatus, including: a receiving block, configured to receive a bit stream generated by encoding: a decoding block, configured to decode the bit stream, and process the decoding results through normalization, a multi-head attention mechanism and a multi-layer perceptron, to output a reconstructed image.

According to an aspect of embodiments of the present disclosure, there is provided a computer-readable medium having stored thereon a computer program which, when being executed by a processor, implements the image encoding method or the image decoding method in the above technical solutions.

According to an aspect of embodiments of the present disclosure, there is provided an electronic device, including: a processor; and a memory configured to store instructions executable by the processor: where the processor is configured to perform the image encoding method or the image decoding method in the above technical solutions by executing the executable instructions.

According to an aspect of embodiments of the present disclosure, there is provided a computer program product or a computer program, the computer program product or the computer program includes computer instructions that are stored in a computer-readable storage medium. A processor of a computer device reads the computer instructions from the computer-readable storage medium, and the processor executes the computer instructions to cause the computer device to perform the image encoding method or the image decoding method in the above technical solutions.

It should be understood that the foregoing general description and the following detailed description are illustrative and explanatory only and are not restrictive of the present disclosure.

BRIEF DESCRIPTION OF THE DRAWINGS

The accompanying drawings herein that are incorporated into the specification and constitute a part of the specification, illustrate embodiments consistent with the present disclosure, and together with the specification serve to explain the principles of the present disclosure. Understandably, the accompanying drawings described below are only some embodiments of the present disclosure, and other accompanying drawings can be obtained by those of ordinary skill in the art based on these accompanying drawings without creative work.

DETAILED DESCRIPTION

Figure 1:
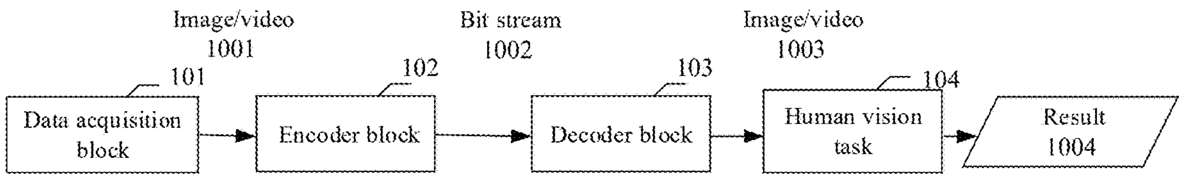
FIG. 1 is a schematic block diagram showing an illustrative image coding and decoding system architecture.

Illustrative implementations will now be described more completely with reference to the accompanying drawings. However, the illustrative implementations can be implemented in a variety of forms and should not be construed as being limited to the instances set forth herein: rather, these implementations are provided so that the present disclosure will be more comprehensive and complete and will fully convey the concept of the illustrative implementations to those skilled in the art.

In addition, the features, structures or characteristics described may be combined in one or more embodiments in any suitable manner. In the following description, many specific details are provided so as to provide a full understanding of the embodiments of the present disclosure. However, those skilled in the art will appreciate that the technical solutions of the present disclosure may be practiced without one or more of the specific details, or with other methods, elements, means, steps, etc. In other cases, the methods, devices, implementations or operations that are well known are not shown or described in detail to avoid blurring the aspects of the present disclosure.

The block diagrams shown in the accompanying drawings are merely functional entities and do not necessarily correspond to physically independent entities. That is, these functional entities may be implemented in software form, or in one or more hardware modules or integrated circuits, or in different networks and/or processor devices and/or microcontroller devices.

The flowcharts shown in the accompanying drawings are only illustrative and do not necessarily include all the contents and operations/steps, nor are they necessarily executed in the order described. For example, some operations/steps can be decomposed, and some operations/steps can be combined or partially combined, so that the actual execution order may change depending on actual conditions.

With the popularization of intelligent machine vision tasks, such as the rapid development of image classification, video target detection, target tracking, image segmentation, and pedestrian re-identification, if the existing related technology is adopted for image/video encoding and decoding based on a convolutional neural network, since this method uniformly encodes all areas of the entire image, it is not conducive to image encoding/decoding.

In this regard, the present disclosure provides an image encoding method and apparatus, a decoding method and apparatus, a readable medium and an electronic device. In the technical solutions provided by the embodiments of the present disclosure, the original image is first partitioned into patches, and gradient calculation for patch areas and a vision transformation model are combined. In this way, the method performs selective and controllable compression on different information areas of the compressed image, retains as much as possible the key areas with dense information in the image/video and performs compression on these areas as little as possible; and performs compression on non-key areas with sparse information in the image as much as possible, thereby improving the image compression efficiency and realizing flexible bit rate control under a unified solution, and thus improving the image compression efficiency to a certain extent.

Referring to FIG. 1, FIG. 1 is a block diagram schematically showing an architecture of an illustrative image coding and decoding system.

The system includes a data acquisition block 101, an encoder block 102, and a decoder block 103. The data acquisition block 101 is configured to acquire an image/video 1001 and transmit it to the encoder block 102. The encoder block 102 may employ a convolutional neural network to encode the image/video 1001 into a bit stream 1002, and transmit the bit stream 1002 to the decoder block 103 on the other end. The decoder block 103 may also employ a convolutional neural network to reconstruct the bit stream into an image/video 1003. Then, the reconstructed image/video 1003 is used as an input to a human vision task 104. Finally, a result 1004 is obtained through calculation by the human vision task.

The following technical problems exist in this method. The encoder and decoder encode all areas of the image/video uniformly, and cannot distinguish between the key areas and non-key areas of the image itself: after all areas of the image are uniformly encoded, the key areas of the image are compressed more, and important information of the image will be lost: the existing method cannot perform selective compression on each area of the image. That is, the existing image encoding/decoding method cannot discard non-key area image patches in the image when encoding the image. Therefore, the existing encoders designed based on the deep convolutional neural network structure do not have inflexible control on the compression ratio. In addition, the existing encoding/decoding system and method is oriented towards human vision tasks, and when facing machine vision tasks, the system cannot complete machine vision intelligent analysis tasks well.

Figure 2:
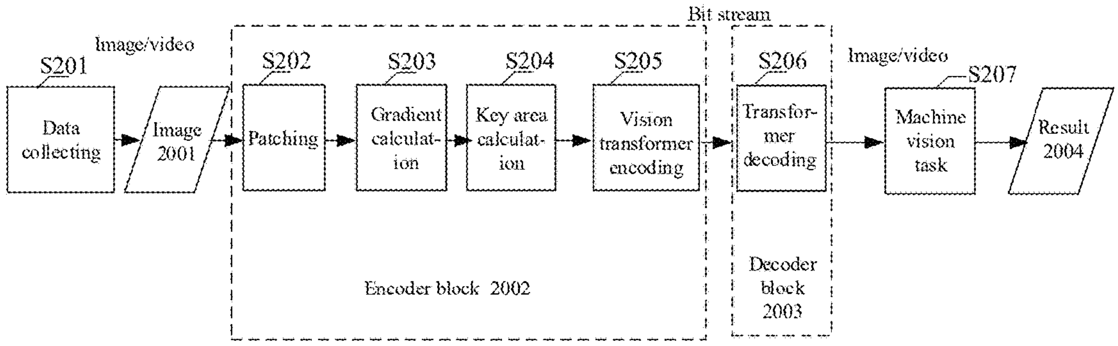
FIG. 2 is a schematic block diagram showing an illustrative system architecture in which a technical solution of the present disclosure is applied.

In order to solve the above problems, the present disclosure redesigns the encoder and decoder blocks in the encoding system oriented towards machine vision intelligent analysis tasks. In the encoder design, an image encoder based on a transformer and regional gradient information are proposed. In the decoder design, a decoder based on the transformer block is proposed. Referring to FIG. 2, FIG. 2 is a block diagram schematically showing an illustrative system architecture applying the technical solution of the present disclosure. The system architecture includes a data collection block for collecting (S201) an image/video to obtain an original image 2001. Then, the original image is input into an encoder block 2002 in which the original image is sequentially subjected to image patching (S202), gradient calculation (S203), key area calculation (S204) and vision transformer encoding (S205), a bit stream is output, the bit stream output from the encoder block 2002 is reconstructed (S206) into an image/video through a decoder block 2003 using a transformer block, the reconstructed image/video is used as an input to a machine vision task; and finally, the result 2004 is obtained through machine vision task calculation (S207).

In order to realize selective compression on different areas of an image/video, the encoder designed by the present disclosure employs a scheme of combining the regional gradient calculation and the transformer block when encoding image/video data, and the image decoder design employs only the transformer block. When encoding an image, the image is partitioned into patches for calculation, and then gradient values of image pixels in each of the patch areas are calculated, and an average value of the calculated gradient values of each area is calculated. All image patches are sorted according to the average value of the gradient calculation values, and the patches with the lower ranking are discarded. The image patches with the higher ranking are input into the subsequent transformer block, and the pictures of the other image patch areas are directly discarded. The compression rate can be flexibly controlled by controlling the proportion of the discarded images.

The image encoding method and apparatus, decoding method and apparatus, readable medium and electronic device provided by the present disclosure are described in detail below in conjunction with specific implementations.

Figure 3:
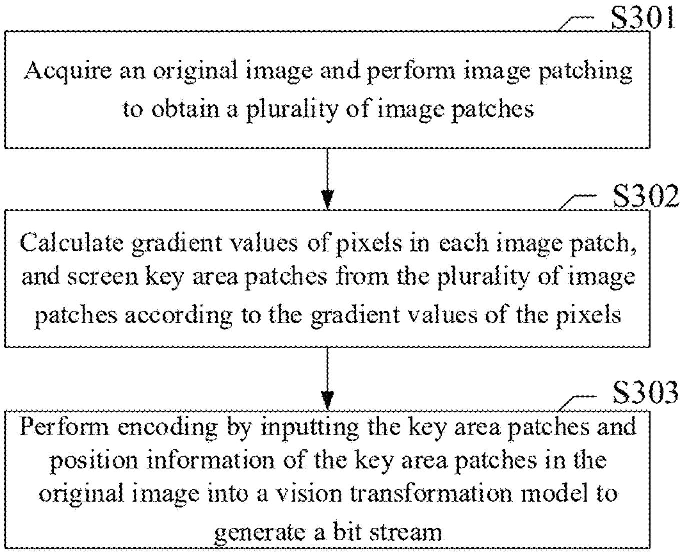
FIG. 3 is a flowchart schematically showing steps of an image encoding method provided by an embodiment of the present disclosure.

Referring to FIG. 3, FIG. 3 schematically shows a flow of steps of an image encoding method provided by an embodiment of the present disclosure. The image encoding method may be performed by a controller, and may primarily include the following steps S301 to S303.

In step S301, an original image is acquired and image patching is performed to obtain a plurality of image patches.

In some embodiments, the image/video can be acquired through the data collection block to obtain the original image, and then image patching is performed on the original image. For example, the size of the original image is n Xn, and the n×n image is evenly partitioned into m×m patches according to the non-overlapping areas, and the size of each image patch is $$\frac{n}{m} \times \frac{n}{m}.$$

Figure 4:
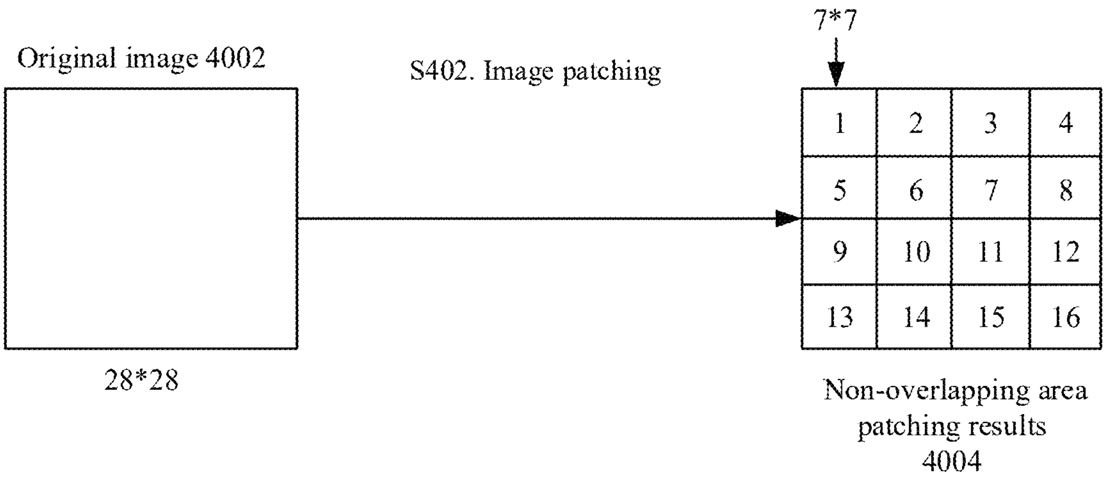
FIG. 4 is a schematic diagram schematically showing image patching applying the technical solution of the present disclosure.

Referring to FIG. 4, FIG. 4 is a schematic diagram schematically shows the image patching that employs the technical solution of the present disclosure. Taking a 28*28 original image 4002 as an example, it is evenly partitioned into a number 4*4 of image patches according to the non-overlapping areas (S402), and a patching result 4004 is obtained, where the size of each image patch is 7*7. In this way, by performing image patching on the original image, it can be beneficial to determine the key area patches later.

In step S302, gradient values of pixels in each image patch is calculated, and key area patches are screened from the plurality of image patches according to the gradient values of the pixels.

In some embodiments, by calculating the gradient values of pixels in each patch, it is beneficial to screen out the key area patches according to the gradient values of pixels. In this way, selective and controllable compression can be performed on different information areas of the compressed image, the key areas with dense information in the image/video are retained as much as possible and compressed as little as possible: while the non-key areas with sparse information in the image are compressed as much as possible, thereby improving the image compression efficiency and realizing flexible bit rate control under a unified solution.

In step S303, encoding is performed by inputting the key area patches and position information of the key area patches in the original image into a vision transformation model to generate a bit stream.

In the technical solution provided by the embodiments of the present disclosure, the original image is first partitioned into patches, and the gradient calculation for the patch areas and the vision transformation model are combined. In this way, the method selectively and controllably compresses different information areas of the compressed image, the key areas with dense information in the image/video are retained as much as possible and compressed as little as possible: while the non-key areas with sparse information in the image are compressed as much as possible, thereby improving the image compression efficiency and realizing flexible bit rate control under a unified solution.

In some embodiments of the present disclosure, calculating the gradient values of pixels in each image patch and screening key area patches from the plurality of image patches based on the gradient values of the pixels may include: calculating the gradient values of pixels in each image patch, calculating an average gradient value of each image patch based on the gradient values of the pixels; sorting the plurality of image patches based on the average gradient values, and determining the image patch whose average gradient value is not less than a preset value among the plurality of image patches as key area patch.

In this way, sorting is performed according to the calculated average gradient values and the key areas where information is concentrated are screened out, and the non-key area patches in the image can be discarded so as to achieve image compression.

In some embodiments, when selecting the key area patches, the gradient of each pixel in each image patch (x, y) in its x direction and y direction is first calculated, respectively. The gradient of the x direction is calculated as shown in the following formula (1):

$$\frac{\partial f(x, y)}{x} = f(x+1, y) - f(x, y) = g_x \tag{1}$$

The gradient of the y direction is calculated as shown in the following formula (2):

$$\frac{\partial f(x, y)}{y} = f(x, y+1) - f(x, y) = g_y \tag{2}$$

The gradient value $g_x$ in the x direction and the gradient value $g_y$ in the y direction of the pixel (x, y) are calculated as shown in the following formula (3):

$$g(x, y) = \sqrt{(g_x)^2 + (g_y)^2} \tag{3}$$

where g(x, y) is the gradient calculation value of (x, y). Then calculation for the gradient calculation values of all pixels in the patch area is performed as shown in the following formula (4):

$$d(i,j)=\frac{\sum_{y=0}^{\frac{n}{m}-1}\sum_{x=0}^{\frac{n}{m}-1}g(x,y)}{\frac{n}{m}\times\frac{n}{m}},\ (0<i<m-1,\ 0<j<m-1) \tag{4}$$

where d(i,j) is the average gradient value of all pixels in each patch. The values of i and j are in the range of 0 to m−1.

Figure 5:
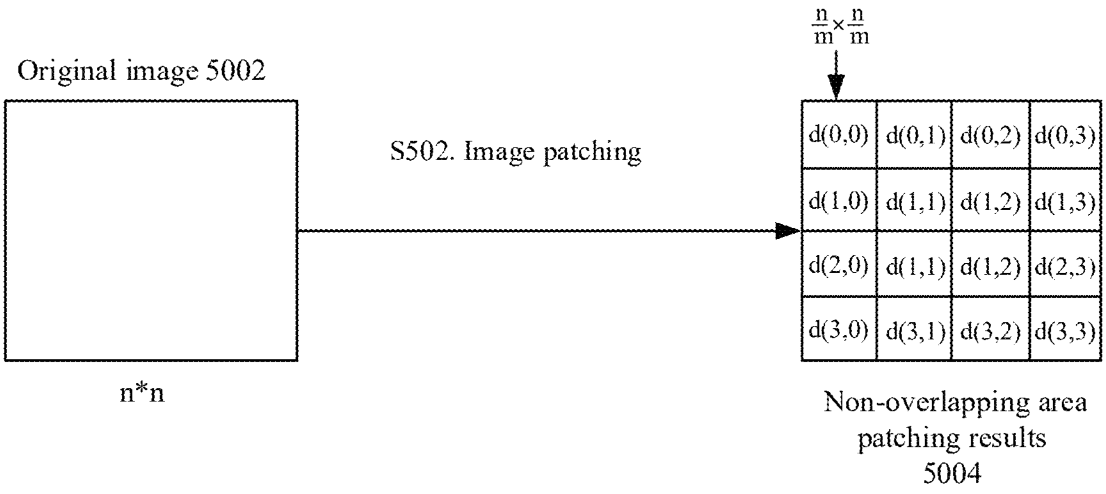
FIG. 5 is a schematic diagram schematically showing an average gradient value of each patch applying the technical solution of the present disclosure.

Referring to FIG. 5, FIG. 5 is a schematic diagram schematically showing the average gradient value of each image patch using the technical solution of the present disclosure. The original image 5002 of size n×n is evenly partitioned into m×m patches 504 according to the non-overlapping areas (S502), and the size of each of the obtained image patches is $$\frac{n}{m}\times\frac{n}{m}.$$

Then all the image patches are sorted according to the values of d(i,j) in a decreasing order, that is, they are sorted in sequence in an order of {d(2,2), d(1,2), d(2,1), d(1,1), . . . }. The p image patches with smaller d(i,j) values at the lower ranking in the sorting are discarded, the number of remaining image patches is n×n−p, and these remaining image patches are determined as the key area patches.

In this way, the method selectively and controllably compresses different information areas of the compressed image, retains as much as possible the key areas with dense information in the image/video and compresses them as little as possible: while compressing the non-key areas with sparse information in the image as much as possible, thereby improving the image compression efficiency and achieving flexible bit rate control under a unified scheme.

In an embodiment of the present disclosure, the key area patches and the position information of the key area patches in the original image are input into a vision transformation model for encoding to generate a bit stream, including: inputting the key area patches into the vision transformation model, outputting encoded visible patches and mask tokens: generating image tokens according to the encoded visible patches, the mask tokens and the position information of the key area patches in the original image, and generating the bit stream according to the image tokens.

Figure 6:
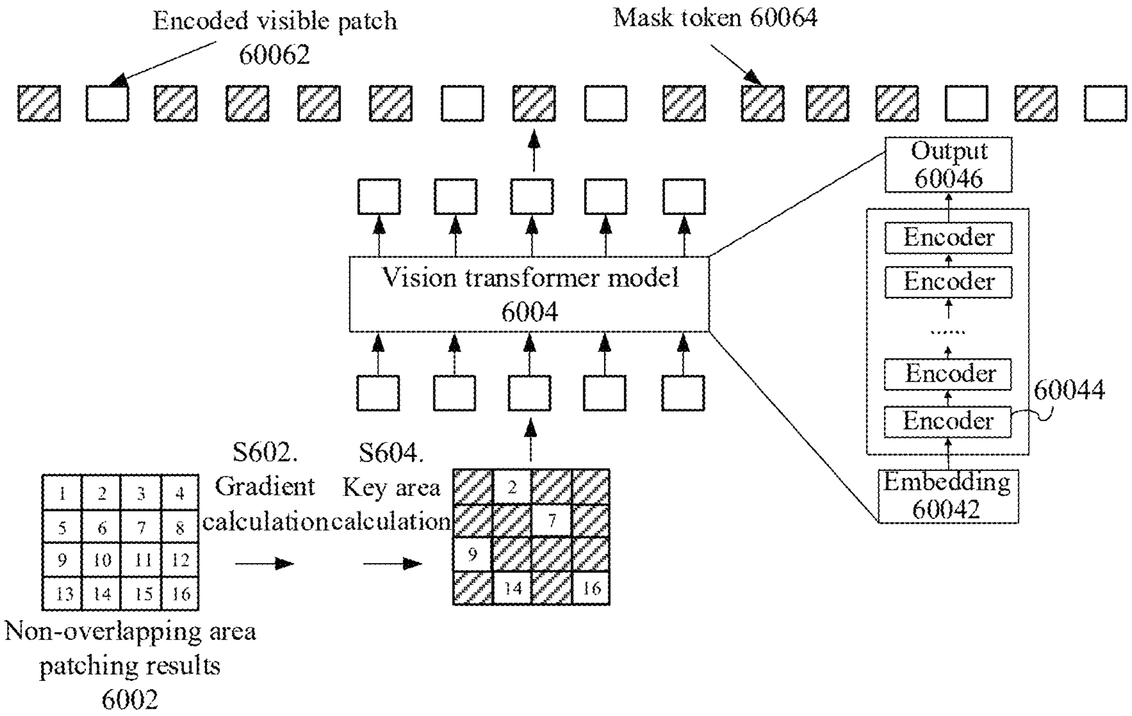
FIG. 6 is a schematic diagram schematically showing an encoder block applying the technical solution of the present disclosure.

Referring to FIG. 6, FIG. 6 is a schematic diagram schematically showing an encoder block applying the technical solution of the present disclosure. After obtaining the non-overlapping region patching result 6002 of the original image and performing gradient calculation (S602), the key area patches are determined by performing key area calculation (S604), and the key area patches that are not discarded and their position information in the original image are input into the vision transformer model 6004. The patch embedding and positional embedding 60042 information of the key area patches are input into the encoder block 60044 of the vision transformer model 6004.

After the calculation through multiple encoder blocks of the vision transformation model 6004, the same number of p pieces of patch information and position information as the input are obtained, and then the d×d image patches having the same size as the original image are rearranged according to the position information. In these d×d image patches, the patch information of the key area patches that are not discarded previously is obtained through calculation by the vision transformation model 6004, which are called Encoded Visible Patches, and the others are obtained though rearrangement according to the position information, which are called Mask Tokens.

As such, the video encoding systems and methods in the related art are all oriented to human vision tasks, and cannot well complete machine vision intelligent analysis tasks when oriented to machine vision tasks, while the technical proposal of the present embodiments is oriented to machine vision tasks, and can well complete machine vision intelligent analysis tasks.

In some embodiments of the present disclosure, the preset value may be set so that the number of the discarded image patches and the preset compression ratio α of the image satisfy the formula (5):

$$\alpha=\frac{n^2-p\left(\frac{n}{m}\right)^2}{n^2}\times 100\% \tag{5}$$

where p is the number of the discarded image patches.

In this way, by controlling the ratio of the discarded image patches after the image patching, the compression rate can be flexibly controlled.

According to an aspect of an embodiment of the present disclosure, an image decoding method is provided to decode the encoding performed by the image encoding method as described above, the image decoding method including: receiving a bit stream generated by encoding: decoding the bit stream, and processing the decoding result through normalization, a multi-head attention mechanism and a multi-layer perceptron, and outputting a reconstructed image.

Figure 7:
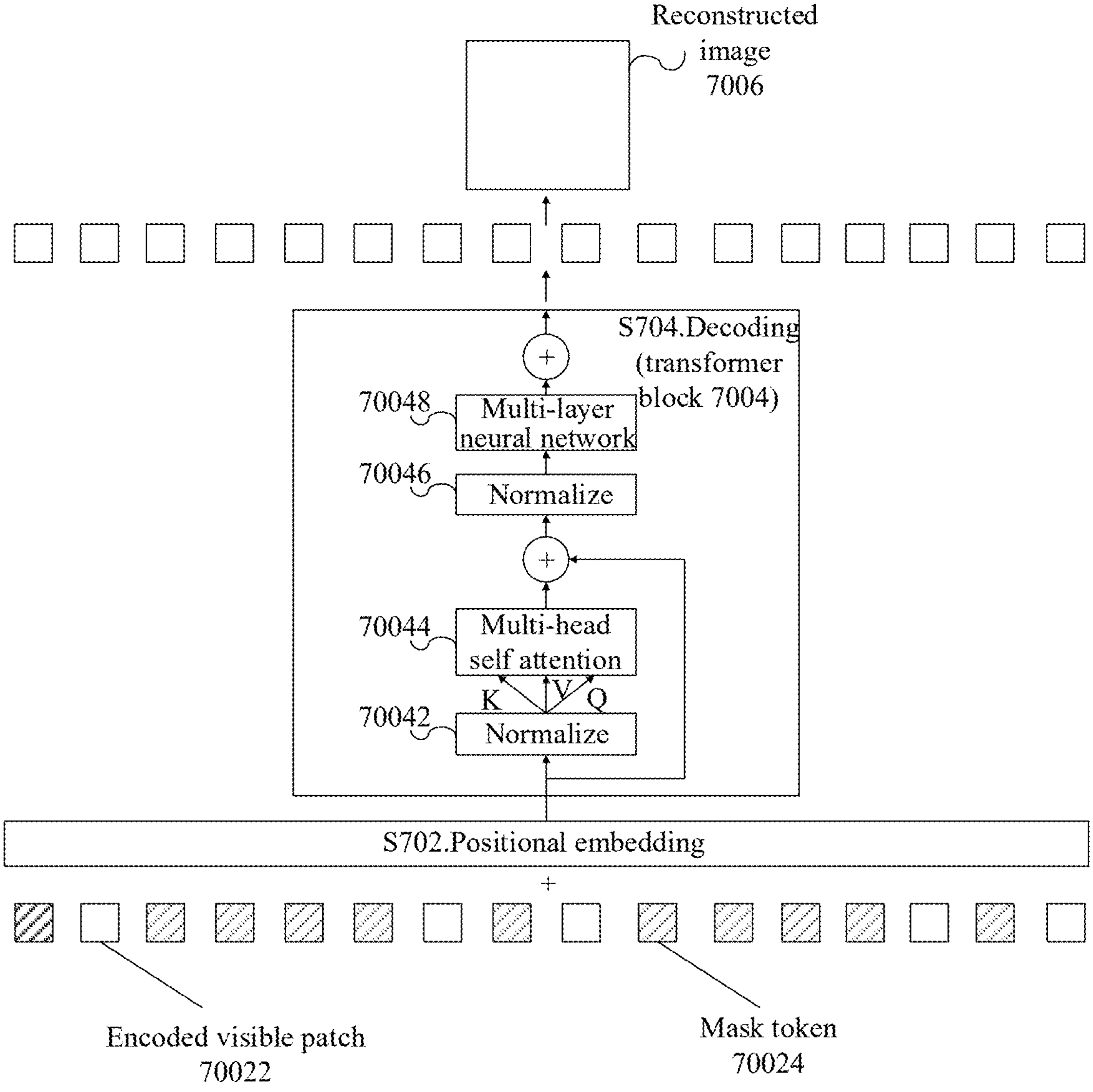
FIG. 7 is a schematic diagram schematically showing a decoder block applying the technical solution of the present disclosure.

Referring to FIG. 7, FIG. 7 is a schematic diagram schematically showing a decoder block applying the technical solution of the present disclosure. Referring to FIG. 7, after obtaining the output encoded visible patches 70022 and mask tokens 70024 of the vision transformation model based on area gradient information, these two parts are positionally embedded (S702) and added together in accordance with the position information of the original image, and the result of the addition is input into a decoder constructed with a transformer block 7004 for decoding (S704). In the decoder, the transformer block 7004 is composed of normalization layers 70042 and 70046, a multi-head self attention layer 70044, and a multi-layer neural network (also known as a Multi-Layer Perceptron, MLP) block 70048.

After the information of the image patch having a vector t output by the normalization layer 70042 is input into the multi-head self attention layer 70044, a weight matrix in $W_t$ in the multi-head self attention layer 70044 and a attention weight matrix $$[W_t^Q, W_t^K, W_t^V]$$

of each head are randomly initialized.

Then, the vector t of the image patch is multiplied by the attention weight matrix $$[W_t^Q, W_t^K, W_t^V]$$

of each head, respectively, to calculate three matrices $Q_t$, $K_t$, $V_t$ corresponding to the image patch vector. The calculation formula is as shown in the following formula (6):

$$\begin{cases} t\times W_t^Q = Q_t \\ t\times W_t^K = K_t \\ t\times W_t^V = V_t \end{cases} \tag{6}$$

Then the vector t of each image patch corresponds to the attention of each head, which is calculated as shown in the following formulas (7) and (8):

$$s_t = \delta(Q_t, K_t, V_t) = \tau\left(\frac{Q_t K_t^T}{\sqrt{m_{K_t}}}\right)V_t \tag{7}$$

$$r = \varphi(s_1, s_2, \ldots, s_t)W_t^e \tag{8}$$

In the formulas, $s_t$ is the head the attention of which the image patch vector t corresponds to, $m_{K_t}$ is the dimension of the matrix $K_t$, $\delta(Q_t, K_t, V_t)$ is the function for calculating the attention, and $$\tau\left(\frac{Q_t K_t^T}{\sqrt{m_{K_t}}}\right)$$

is a Softmax logistic regression function.

In the formula (8), $\varphi(s_1, s_2, \ldots, s_t)$ represents a concatenation function, $$W_t^e$$

is a parameter matrix, and the calculation result r represents the value for the multiple heads. The output of the decoder is the reconstructed image 7006.

Figure 8:
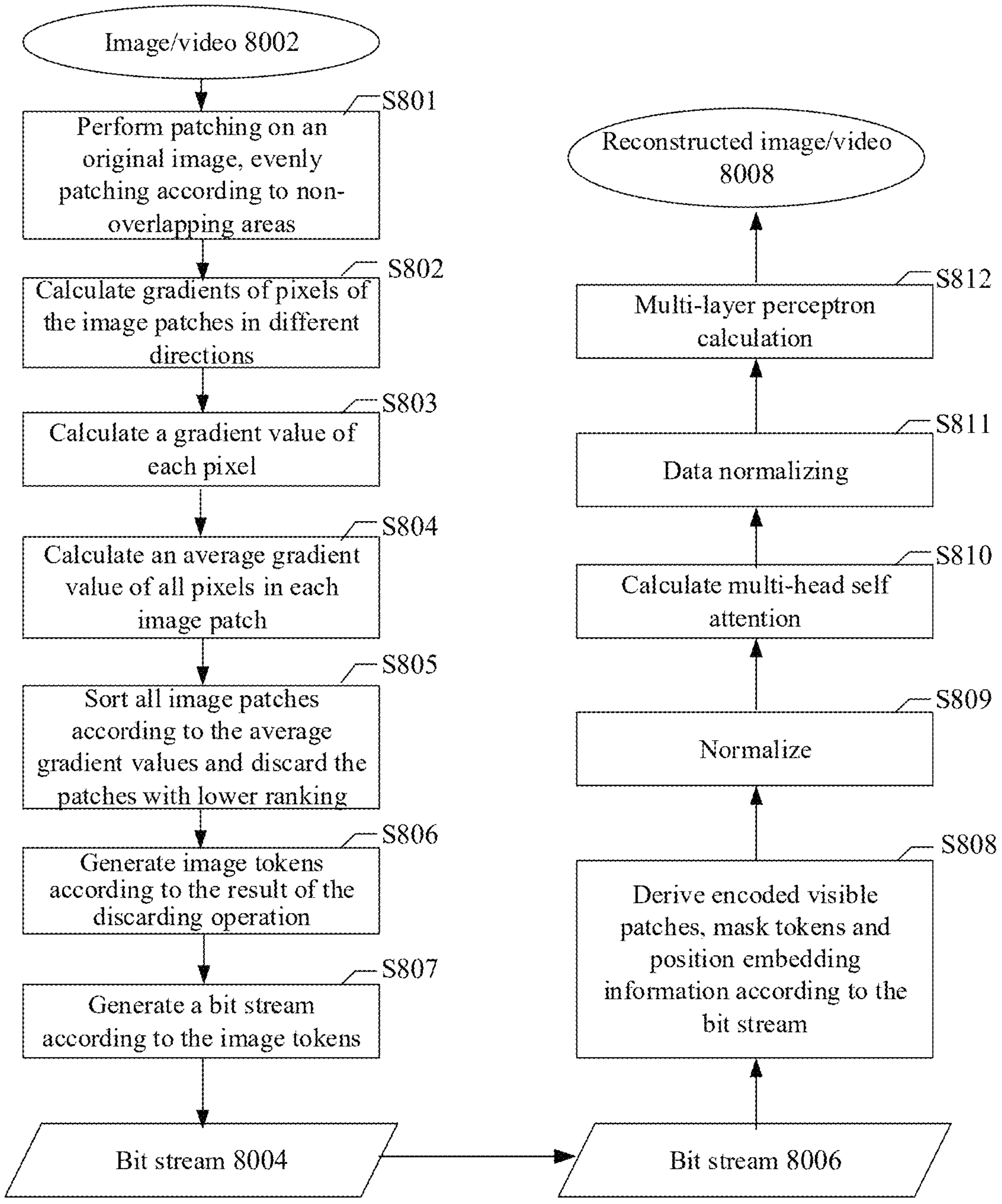
FIG. 8 is a schematic diagram schematically showing an encoding and decoding process applying the technical solution of the present disclosure.

In order to facilitate understanding of the technical solution of the present disclosure, reference is made to FIG. 8, which is a schematic diagram schematically showing an encoding and decoding process applying the technical solution of the present disclosure.

On the encoding side, in step S801, patching calculation is performed on the original image (or video) 8002, and the n×n image is evenly partitioned into m×m patches according to non-overlapping areas.

In step S802, for each of the pixels in the image patch (x, y), a gradient in the x direction and a gradient in the y direction are calculated using the formulas (1) and (2), respectively.

In step S803, a gradient calculation value of the pixel (x, y) is calculated using formula (3).

In step S804, an average gradient value of all pixels in each of the image patches is calculated using formula (4).

In step S805, all image patches are sorted according to values of d(i,j). The p patches with smaller d(i,j) values at the lower ranking in the sorting are discarded. The calculation of the compression ratio $\alpha$ satisfies the formula (5).

In step S806, image tokens are generated according to the result of the discarding operation, which include, for example, encoded visible patches and mask tokens.

In step S807, a bit stream 8004 is generated according to the image tokens.

On the decoding side, in step S808, the encoded visible patched, mask tokens and positional embedding information are derived from the bit stream 8006.

In step S809, the data obtained by performing positional embedding on the encoded visible patches and the mask tokens is normalized.

In step S810, multi-head self attention is calculated using formulas (6) to (8).

In step S811, the calculation result of the multi-head self attention is normalized.

In step S812, multi-layer perceptron calculation is performed on the normalization result.

In step S813, the reconstructed image/video 8008 is output.

In the image encoding and decoding, the present disclosure designs an image codec by adopting the scheme based on area gradient calculation, that is, performing selective compression on the image content information; proposes to calculate the gradient, gradient calculation value and average gradient calculation value of the patched image, and screen out the key information patches according to the average gradient calculation value; proposes the concept of calculating the key areas according to the average gradient calculation value information, sorts and screens out the key areas with concentrated information, and discards the non-key areas in the image to achieve selective compression of the image; and can be flexibly control the compression rate by controlling the ratio of the discarded image patches after the image patching. In addition, the video encoding systems and methods in the related technical solutions are all oriented to human vision tasks, and when facing machine vision tasks, they cannot complete the machine vision intelligent analysis tasks well. The system proposed in the present disclosure is oriented to machine vision tasks and can better complete the machine vision intelligent analysis tasks.

It should be noted that although the steps of the method in the present disclosure are described in a specific order in the drawings, this does not require or imply that the steps must be performed in this specific order, or that all the steps shown must be performed to achieve the desired results. Additionally or alternatively, some steps may be omitted, multiple steps may be combined into one step, and/or one step may be decomposed into multiple steps, etc.

Figure 9:
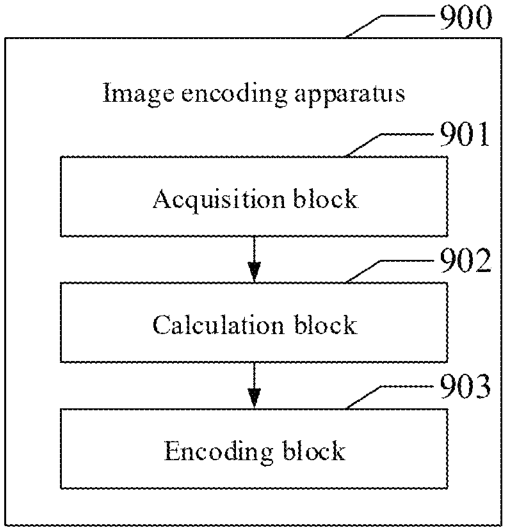
FIG. 9 is a structural block diagram schematically showing an image encoding apparatus provided by an embodiment of the present disclosure.

An apparatus embodiment of the present disclosure is described below; which can be configured to perform the image encoding method or image decoding method in the above embodiments of the present disclosure. FIG. 9 is a structural block diagram schematically showing an image encoding apparatus provided by an embodiment of the present disclosure. As shown in FIG. 9, an image encoding apparatus is provided, the image encoding apparatus 900 may include an acquisition block 901, a calculation block 902 and an encoding block 903.

The acquisition block 901 can be configured to acquire an original image and perform image patching to obtain a plurality of image patches.

The calculation block 902 can be configured to calculate gradient values of pixels in each of the image patches, and screens out key area patches from the plurality of image patches according to the gradient values of the pixels.

The encoding block 903 can be configured to perform encoding by inputting the key area patches and position information of the key area patches in the original image into a vision transformation model to generate a bit stream.

In some embodiments of the present disclosure, the calculation block 902 may also be configured to calculate the gradient values of the pixels in each image patch, calculate an average gradient value of each image patch based on the gradient values of the pixels; sort the plurality of image patches based on the average gradient values, and determine the image patches for which the average gradient value is not less than a preset value among the plurality of image patches as key area patches.

In some embodiments of the present disclosure, the encoding block 903 may also be configured to input the key area patches into a vision transformation model, output encoded visible patches and mask tokens: generate image tokens based on the encoded visible patches, mask tokens and position information of the key area patches in the original image, and generate a bit stream based on the image tokens.

In some embodiments of the present disclosure, based on the above technical solution, the acquisition block 901 can also be configured to obtain the n×n original image, where n is a positive integer; evenly partition the n×n original image into m×m patches according to non-overlapping areas, and obtain the image patches each of which has a size of $$\frac{n}{m} \times \frac{n}{m},$$

where m is a positive integer and n>m.

In some embodiments of the present disclosure, the calculation block may also be configured to discard the image patches for which the average gradient value is less than a preset value among the plurality of image patches, where the preset value is set so that the number of the discarded image patches and a preset compression ratio α of the image satisfy the formula:

$$\alpha = \frac{n^2 - p\left(\frac{n}{m}\right)^2}{n^2} \times 100\%,$$

where p is the number of the discarded image patches.

According to an aspect of embodiments of the present disclosure, an image decoding apparatus is provided, which may include: a receiving block, which can be configured to receive a bit stream generated by encoding: a decoding block, which can be configured to decode the bit stream, and process the decoding result through normalization, a multi-head attention mechanism and a multi-layer perceptron, and output a reconstructed image.

The specific details of the image encoding apparatus or image decoding apparatus provided in the embodiments of the present disclosure have been described in detail in the corresponding method embodiments and will not be repeated here.

Figure 10:
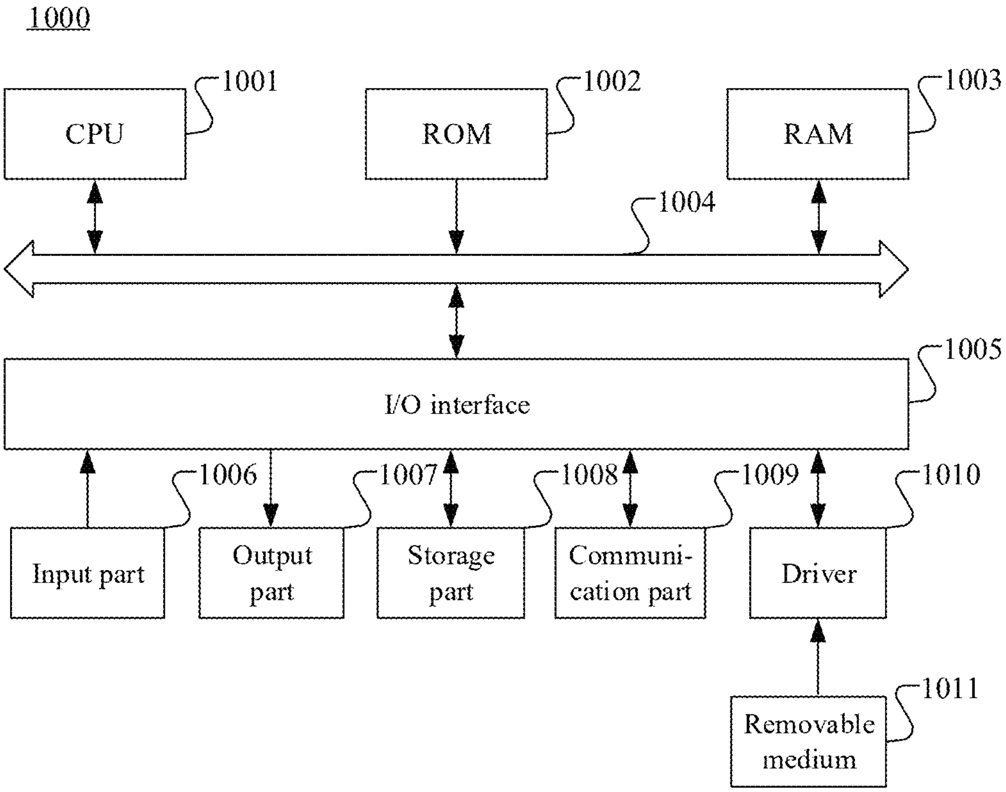
FIG. 10 is a structural block diagram schematically showing a computer system structure suitable for implementing an electronic device in an embodiment of the present disclosure.

FIG. 10 is a block diagram schematically showing a computer system structure of an electronic device for implementing the embodiments of the present disclosure.

It should be noted that the computer system 1000 of the electronic device shown in FIG. 10 is only an example and should not impose any limitation on the functions and scope of use of the embodiments of the present disclosure.

As shown in FIG. 10, the computer system 1000 includes a central processing unit (CPU) 1001, which can perform various appropriate actions and processes according to a program stored in a read-only memory 1002 (ROM) or a program loaded from a storage part 1008 to a random access memory 1003 (RAM). Various programs and data required for system operation are also stored in the random access memory 1003. The central processing unit 1001, the read-only memory 1002 and the random access memory 1003 are connected to each other through a bus 1004. An input/output interface 1005 (i.e., I/O interface) is also connected to the bus 1004.

The following components are connected to the input/output interface 1005: an input part 1006 including a keyboard, a mouse, etc.: an output part 1007 including a cathode ray tube (CRT), a liquid crystal display (LCD), etc., and a speaker, etc.: a storage part 1008 including a hard disk, etc.; and a communication part 1009 including a network interface card such as a local area network card, a modem, etc. The communication part 1009 performs communication processing via a network such as the Internet. A drive 1010 is also connected to the input/output interface 1005 as needed. A removable medium 1011, such as a magnetic disk, an optical disk, a magneto-optical disk, a semiconductor memory, etc., is installed on the drive 1010 as needed so that a computer program read therefrom is installed into the storage part 1008 as needed.

In particular, according to an embodiment of the present disclosure, the processes described in the various method flow charts can be implemented as computer software programs. For example, an embodiment of the present disclosure includes a computer program product, which includes a computer program carried on a computer-readable medium, and the computer program contains program codes for executing the methods shown in the flow charts. In such an embodiment, the computer program can be downloaded and installed from a network through the communication part 1009, and/or installed from the removable medium 1011. When the computer program is executed by the central processor 1001, various functions defined in the system of the present disclosure are executed.

It should be noted that the computer-readable medium shown in the embodiment of the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus or device, or any combination of the above. More specific examples of the computer-readable storage media may include, but are not limited to: an electrical connection with one or more wires, a portable computer disk, a hard disk, a random access memory (RAM), a read-only memory (ROM), an erasable programmable read-only memory (EPROM), a flash memory, an optical fiber, a portable compact disk read-only memory (CD-ROM), an optical storage device, a magnetic storage device, or any suitable combination of the above. In the present disclosure, the computer-readable storage medium may be any tangible medium containing or storing a program, which may be used by or in combination with an instruction execution system, apparatus or device. In the present disclosure, the computer-readable signal medium may include a data signal propagated in a baseband or as part of a carrier wave, which carries computer-readable program codes. Such propagated data signals may take a variety of forms, including but not limited to electromagnetic signals, optical signals, or any suitable combination of the above. The computer readable signal media may also be any computer readable medium other than the computer readable storage media, which may send, propagate, or transmit programs for use by or in conjunction with an instruction execution system, apparatus, or device. The program codes contained in the computer readable medium may be transmitted using any suitable medium, including but not limited to: wireless, wired, etc., or any suitable combination of the above.

The flow charts and block diagrams in the accompanying drawings illustrate the possible architecture, functions and operations of the systems, methods and computer program products according to various embodiments of the present disclosure. In this regard, each box in the flow charts or block diagrams can represent a block, a program segment, or a part of codes, and the block, program segment, or part of codes contains one or more executable instructions for implementing the specified logical function. It should also be noted that in some alternative implementations, the functions marked in the box can also occur in a different order from the order marked in the accompanying drawings. For example, two boxes represented in succession can actually be executed substantially in parallel, or they can sometimes be executed in the opposite order, depending on the functions involved. It should also be noted that each box in the block diagrams or flow charts, and the combination of the boxes in the block diagrams or flow charts can be implemented with a dedicated hardware-based system that performs specified functions or operations, or can be implemented with a combination of the dedicated hardware and computer instructions.

It should be noted that, although several blocks or units of the device for executing actions are mentioned in the above detailed description, such division is not mandatory. In fact, according to the embodiments of the present disclosure, the features and functions of two or more blocks or units described above can be embodied in one block or unit. Conversely, the features and functions of one block or unit described above can be further divided to be embodied in multiple blocks or units.

Through the description of the above implementations, it can be easily understood by those skilled in the art that the illustrative implementations described here can be implemented by software, or by software in combination with necessary hardware. Therefore, the technical solutions according to the implementations of the present disclosure can be embodied in the form of a software product, which can be stored in a non-volatile storage medium (which can be a CD-ROM, a USB flash drive, a mobile hard disk, etc.) or on a network, and includes several instructions to enable a computing device (which can be a personal computer, a server, a touch terminal, or a network device, etc.) to execute the methods according to the implementations of the present disclosure.

Those skilled in the art will readily appreciate other embodiments of the present disclosure after considering the specification and practicing the disclosure disclosed herein. The present disclosure is intended to cover any variations, uses or adaptations of the present disclosure that follow the general principles of the present disclosure and include common knowledge or conventional technical measures in the art that are not disclosed in the present disclosure.

It should be understood that the present disclosure is not limited to the precise structures that have been described above and shown in the drawings, and that various modifications and changes may be made without departing from the scope thereof. The scope of the present disclosure is limited only by the appended claims.

What is claimed is:

1. An image encoding method, comprising:

acquiring an original image and performing image patching to obtain a plurality of image patches;

calculating gradient values of pixels in each of the image patches, and screening out key area patches from the plurality of image patches according to the gradient values of the pixels; and performing encoding by inputting the key area patches and position information of the key area patches in the original image into a vision transformation model to generate a bit stream, wherein the performing encoding by inputting the key area patches and the position information of the key area patches in the original image into the vision transformation model to generate the bit stream comprises:

inputting the key area patches into the vision transformation model, and outputting encoded visible patches and mask tokens; and generating image tokens according to the encoded visible patches, the mask tokens and the position information of the key area patches in the original image, and generating the bit stream according to the image tokens.

2. The image encoding method according to claim 1, wherein the calculating the gradient values of the pixels in each of the image patches and screening out the key area patches from the plurality of image patches according to the gradient values of the pixels comprises:

calculating the gradient values of pixels in each of the image patches, and calculating an average gradient value of each of the image patches according to the gradient values of the pixels; and sorting the plurality of image patches according to the average gradient value, and determining image patches for which the average gradient value is not less than a preset value among the plurality of image patches as the key area patches.

3. The image encoding method according to claim 2, wherein the acquiring the original image and performing image patching to obtain the plurality of image patches comprises:

acquiring the original image having a size of n×n, wherein n is a positive integer; and evenly partitioning the original image having the size of n×n into m×m patches according to non-overlapping areas, to obtain the image patches each of which has a size of $$\frac{n}{m}\times\frac{n}{m},$$

wherein m is a positive integer, and n>m.

4. The image encoding method according to claim 3, wherein the calculating the gradient values of pixels in each of the image patches and screening out the key area patches from the plurality of image patches according to the gradient values of the pixels further comprises:

discarding the image patches for which the average gradient value is smaller than a preset value among the plurality of image patches;

wherein the preset value is set so that the number of the discarded image patches and a preset compression ratio α of the image satisfy the following formula:

$$\alpha = \frac{n^2 - p\left(\frac{n}{m}\right)^2}{n^2} \times 100\%,$$

wherein p is the number of the discarded image patches.

5. An image decoding method, comprising:

receiving a bit stream generated by an image encoding operation, wherein the image encoding operation comprises acquiring an original image and performing patching on the original image to obtain a plurality of image patches;

calculating gradient values of pixels in each of the image patches, and screening out key area patches from the plurality of image patches according to the gradient values of the pixels;

performing encoding by inputting the key area patches and position information of the key area patches in the original image into a vision transformation model to generate the bit stream; and decoding the bit stream, processing results of the decoding through normalization, a multi-head attention mechanism, and a multi-layer perceptron, and outputting a reconstructed image, wherein the performing encoding by inputting the key area patches and the position information of the key area patches in the original image into the vision transformation model to generate the bit stream comprises:

inputting the key area patches into the vision transformation model, and outputting encoded visible patches and mask tokens; and generating image tokens according to the encoded visible patches, the mask tokens and the position information of the key area patches in the original image, and generating the bit stream according to the image tokens.

6. An image encoding apparatus, comprising:

at least one hardware processor; and a memory storing program instructions executable by the at least one hardware processor that, when executed, direct the image encoding apparatus to:

acquire an original image and perform image patching to obtain a plurality of image patches;

calculate gradient values of pixels in each of the image patches, and screening out key area patches from the plurality of image patches according to the gradient values of the pixels; and perform encoding by inputting the key area patches and position information of the key area patches in the original image into a vision transformation model to generate a bit stream, wherein the encoding by inputting the key area patches and the position information of the key area patches in the original image into the vision transformation model to generate the bit stream comprises:

inputting the key area patches into the vision transformation model, and outputting encoded visible patches and mask tokens; and generating image tokens according to the encoded visible patches, the mask tokens and the position information of the key area patches in the original image, and generating the bit stream according to the image tokens.

7. The image decoding method according to claim 5, wherein the calculating the gradient values of the pixels in each of the image patches and screening out the key area patches from the plurality of image patches according to the gradient values of the pixels comprises:

calculating the gradient values of pixels in each of the image patches, and calculating an average gradient value of each of the image patches according to the gradient values of the pixels; and sorting the plurality of image patches according to the average gradient value, and determining image patches for which the average gradient value is not less than a preset value among the plurality of image patches as the key area patches.

8. The image encoding method according to claim 7, wherein the acquiring the original image and performing image patching to obtain the plurality of image patches comprises:

acquiring the original image having a size of n×n, wherein n is a positive integer; and evenly partitioning the original image having the size of n×n into m×m patches according to non-overlapping areas, to obtain the image patches each of which has a size of $$\frac{n}{m} \times \frac{n}{m},$$

wherein m is a positive integer, and n>m.

9. The image encoding method according to claim 8, wherein the calculating the gradient values of pixels in each of the image patches and screening out the key area patches from the plurality of image patches according to the gradient values of the pixels further comprises:

discarding the image patches for which the average gradient value is smaller than a preset value among the plurality of image patches;

wherein the preset value is set so that the number of the discarded image patches and a preset compression ratio α of the image satisfy the following formula:

$$\alpha = \frac{n^2 - p\left(\frac{n}{m}\right)^2}{n^2} \times 100\%,$$

wherein p is the number of the discarded image patches.

* * * * *